(12) United States Patent
Ball

(10) Patent No.: US 6,718,335 B1
(45) Date of Patent: Apr. 6, 2004

(54) DATAWAREHOUSE INCLUDING A META DATA CATALOG

(75) Inventor: Gregory M. Ball, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 09/585,882

(22) Filed: May 31, 2000

(51) Int. Cl.$^7$ ............................................. G06F 17/30
(52) U.S. Cl. ............................................. 707/102; 707/3
(58) Field of Search .......................... 707/1, 102, 101, 707/2, 3, 203

(56) References Cited

U.S. PATENT DOCUMENTS

| | | | |
|---|---|---|---|
| 5,586,326 A | 12/1996 | Ryu et al. ................... | 717/104 |
| 5,644,766 A | 7/1997 | Coy et al. ................... | 707/204 |
| 5,692,181 A * | 11/1997 | Anand et al. ............... | 707/102 |
| 5,721,922 A | 2/1998 | Dingwall | |
| 5,778,368 A | 7/1998 | Hogan et al. ................ | 707/10 |
| 5,787,412 A | 7/1998 | Bosch et al. | |
| 5,835,959 A | 11/1998 | McCool et al. ............. | 711/171 |
| 5,857,197 A * | 1/1999 | Mullins ....................... | 707/102 |
| 5,860,071 A | 1/1999 | Ball et al. .................... | 707/100 |
| 5,870,746 A * | 2/1999 | Knutson et al. ............. | 707/10 |
| 5,999,947 A * | 12/1999 | Zollinger et al. ........... | 707/203 |
| 6,003,039 A * | 12/1999 | Barry et al. ................. | 707/102 |
| 6,018,742 A * | 1/2000 | Herbert, III ................. | 707/102 |
| 6,044,374 A * | 3/2000 | Nesamoney et al. ........... | 707/1 |

FOREIGN PATENT DOCUMENTS

| | | |
|---|---|---|
| JP | WO 97-15018 | 4/1997 |
| WO | WO 99/00745 | 1/1999 |

OTHER PUBLICATIONS

Stephen R. Gardner, "Building the Data Warehouse", Sep. 1998, ACM, Communications of the ACM, vol. 41, No. 9, p. 52–60.*

Charles Bontempo, George Zagelow, "The IBM Warehouse Architecture", Sep. 1998, ACM, Communications of the ACM, vol. 41, No. 9, p. 38–48.*

Dr. Katherine Jones, "An Introduction to Data Warehousing: What are the Implications for the Network?", 1998, John Wiley & Sons, Ltd., Internation Journal of Network Management, vol. 8, p. 42–56.*

Rajasekar, Arcot, "MCAT–A Meta Information Catalog (Version 1.1)", (last modified: May 11, 1998), <http://www.npaci.edu/Research/DI/srb/mcat.html>.

* cited by examiner

Primary Examiner—Jean R. Homere
(74) Attorney, Agent, or Firm—Scully, Scott, Murphy & Presser; William E. Schiesser

(57) ABSTRACT

A data warehouse, including a modeler for database modeling, and an extraction program for extracting data from the database and storing the extracted data. A reporting tool is used to make inquiries of the stored data and to format the results of the inquiries, and a single meta data catalog is coupled to the modeler, the extraction program, and the reporting tool. With the preferred embodiment of this invention, a user needs to update information only once. The meta data then drives changes in associated systems, such as the warehouse, extraction programs and reporting tools. In order to accomplish this, the meta data catalog holds enough information to control all these various part of the process.

6 Claims, 2 Drawing Sheets

DATAWAREHOUSE INCLUDING A META DATA CATALOG

BACKGROUND OF THE INVENTION

1. Technical Field

This invention generally relates to meta data, and more specifically, to a meta data repository that stores summary information about data.

2. Prior Art

Meta data is information about data. For example, meta data about a particular database might contain descriptions about what type of information is held in each table and field within the database. The databases meta data would also explain the physical attributes of the database such as the types and lengths of the fields, table spacing, indexing, etc. Basically, the meta data repository should be the one place to find out everything and anything about a database.

Meta data catalogs are collections or repositories of meta data. These catalogs are playing an increasingly vital role in publishing authenticated information and in storing and disseminating such information through a controlled but uniform interface. While these catalogs are of substantial use, the normal meta data catalog has several constraints. For instance, these catalogs are inactive—that is, nothing can really be done to the data in the catalogs. Also, these catalogs provide only limited information. The meta data catalog may provide complete information about a particular database, but all the information in that database came from another database, and often a user needs to know more about that other database.

Various attempts have been made to eliminate or alleviate these constraints. A persistent problem, however, is that the catalogs do not hold all the information a user might want. In particular, while a meta data catalog may hold all the physical information of a database, a user is normally not able to determine from the catalog, where the information came from—that is, the mappings indicating how one database maps to another.

In addition, when several systems are used that all need meta data to function and that all have their own meta data repositories, these repositories must be kept in synchronization with each other. For instance, typically in a data warehouse, extraction programs are used to move data from the operational system to the warehouse, and reporting tools are used to allow business analysts to analyze the warehoused data. Both the extraction programs and the reporting tools have their own meta data; and if a field on one table in the operation system changes, this information must be updated in several places: the warehouse itself, the extraction programs, and the reporting tools.

SUMMARY OF THE INVENTION

An object of this invention is to provide an improved meta data catalogue.

Another object of the present invention is to provide a meta data catalog with the ability to drive changes in associated systems.

These and other objective are achieved with a data warehouse, comprising means for database modeling, and means for extracting data from the database and storing the extracted data. A reporting tool is used to make inquiries of the stored data and to format the results of the inquiries, and a single meta data catalog is coupled to the means for modeling, the means for extracting and storing, and the reporting tool. With the preferred embodiment of this invention, a user needs to update information only once. The catalog meta data then drives changes in associated systems, such as a warehouse, extraction programs and reporting tools. In order to accomplish this, the meta data catalog holds enough information to control all these various parts of the process.

The present invention allows a developer to quickly model a new database based on an existing database, identify how the two databases are linked to each other (mapping information), create the database definition, and then use all this captured information in a variety of reporting methods. All the pertinent data are in one location. The meta data catalog is of particular use in very large databases (1000+ tables), because much of the functionality included allows changes to the data model to be made quickly and globally when needed.

Further benefits and advantages of the invention will become apparent from a consideration of the following detailed description, given with reference to the accompanying drawing, which specifies and shows a preferred embodiment of the invention.

DETAILED DESCRIPTION OF THE PREFERRED EMBODIMENTS

Figure 1:
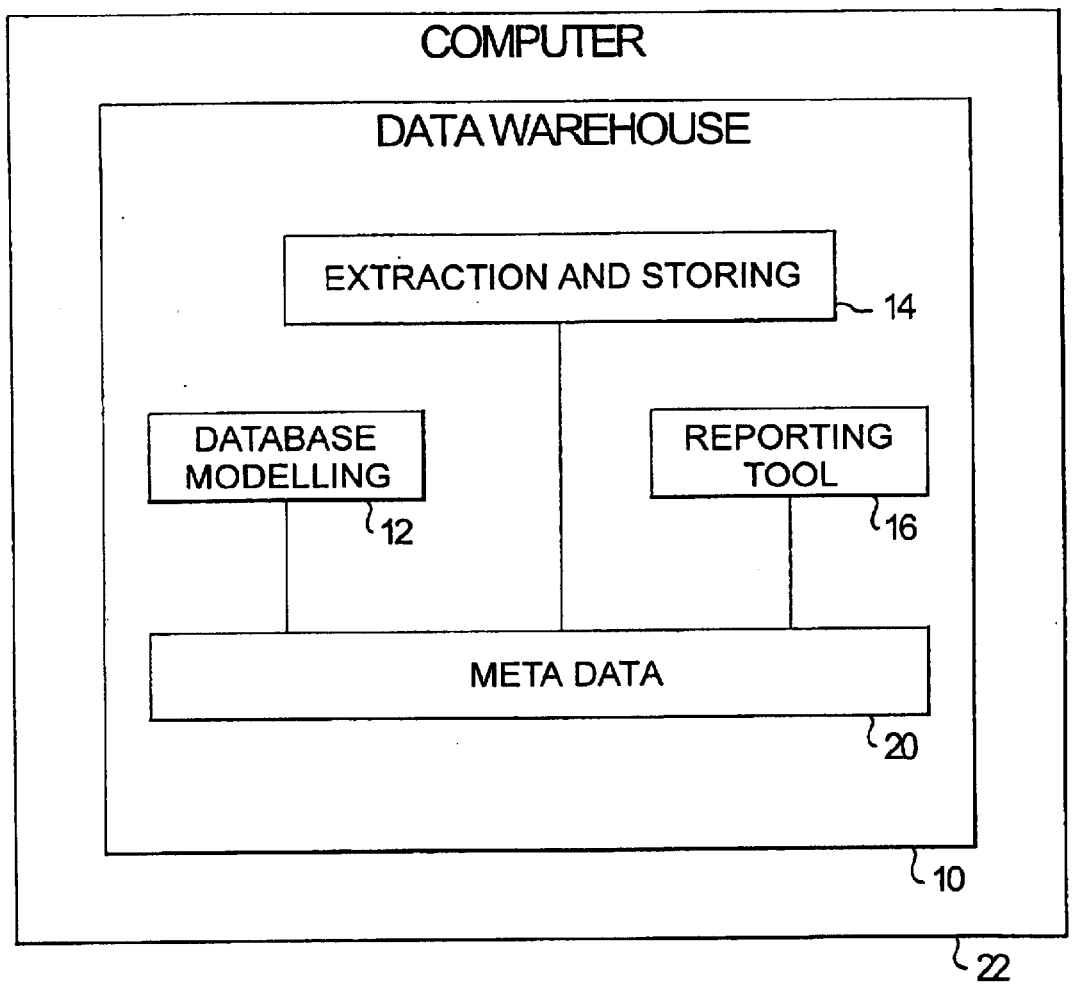
FIG. 1 illustrates a data warehouse embodying the present invention.
Figure 2:
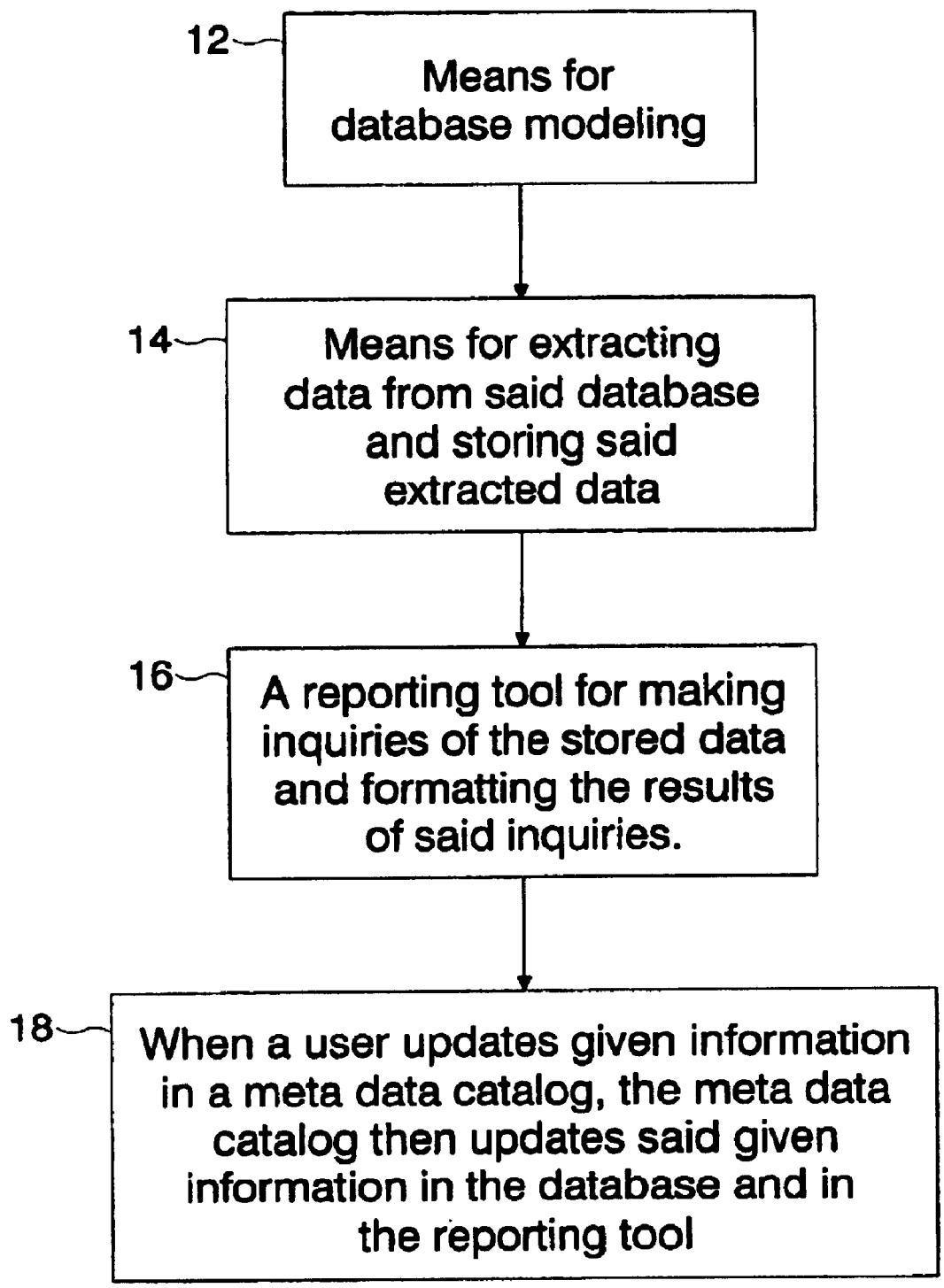
FIG. 2 is a flow chart illustrating functions of elements of the data warehouse.

FIGS. 1 and 2 shows a data warehouse 10, comprising means 12 for database modeling, and means 14 for extracting data from said database and storing the extracted data. A reporting tool 16 is used to make inquiries of the stored data and to format the results of the inquiries, and a single meta data catalog 20 is coupled to the means for modeling, the means for extracting and storing, and the reporting tool. Preferably, a user needs to update information only once. The meta data catalog 20 then drives changes in associated systems, such as warehouse 10, extraction programs 14, and reporting tools 16. In order to accomplish this, the meta data catalog 20 holds enough information to control all these various parts of the process.

The meta data repository stores summary information about data. For example, meta data about a particular database might contain descriptions about what type of information is held in each table and field within the database. The database's meta data would also explain the physical attributes of the database. The invention allows the developer to quickly model a new database based on an existing database, identify how the two databases are linked to each other (mapping information), create the database definition, and then use all this captured information in a variety of reporting methods.

The invention stores meta data from different databases in a single meta data catalog 20. All the pertinent data is in one location. The meta data catalog 20 is of particular use in very large databases (1000+tables), because much of the functionality included allows changes to the data model to be made quickly and globally when needed.

The data warehouse 10 may be part of a database computer 22. More specifically, database computer 22 includes one or more storage media containing the data warehouse 10. Database computer 22 is preferably a massively parallel process computer and executes the UNIX operating system or Windows NT, although other computer and operating system configurations are also envisioned by the present invention. Data warehouse 10 is suited to run on any computer that supports an Open Database Connect (ODBC) interface to data warehouse.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A data warehouse comprising:

means for modeling;

an extraction program for extracting data from said database and storing said extracted data;

a reporting tool for making inquiries of said stored extracted data and for formatting the results of said inquiries; and a single meta data catalog coupled to said means for modeling, said extraction program, and said reporting tool; and wherein, the meta data catalog stores meta data from different databases, and said meta data catalog includes mapping information identifying how two databases are linked to each other; and wherein, the meta data catalog then updates said received meta data information in a plurality of associated systems, including the extraction program and the reporting tool.

2. A data warehouse according to claim 1, wherein a user needs to update information only once in the meta data catalog, and the meta data then drives changes in the extraction program and the reporting tool.

3. A data warehouse according to claim 1, wherein the meta data catalog explains physical attributes of the database.

4. A data warehouse according to clam 1, wherein the data warehouse is part of a database computer.

5. A data warehouse according to claim 4, wherein said database computer includes one or more storage media containing the data warehouse.

6. A data warehouse according to claim 4, wherein said database computer is a parallel process computer.

* * * * *

UNITED STATES PATENT AND TRADEMARK OFFICE
CERTIFICATE OF CORRECTION

PATENT NO.    : 6,718,335 B1
DATED         : April 6, 2004
INVENTOR(S)   : Gregory M. Ball It is certified that error appears in the above-identified patent and that said Letters Patent is hereby corrected as shown below:

Column 4,
Line 17, "clam" should read -- claim --.

Signed and Sealed this

Twenty-fourth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,718,335 B1  Page 1 of 1
APPLICATION NO. : 09/585882
DATED : April 6, 2004
INVENTOR(S) : Gregory M. Ball It is certified that error appears in the above-identified patent and that said Letters Patent is hereby corrected as shown below:

Drawings,
Delete Figure 1 and replace with Figure 1 as shown:

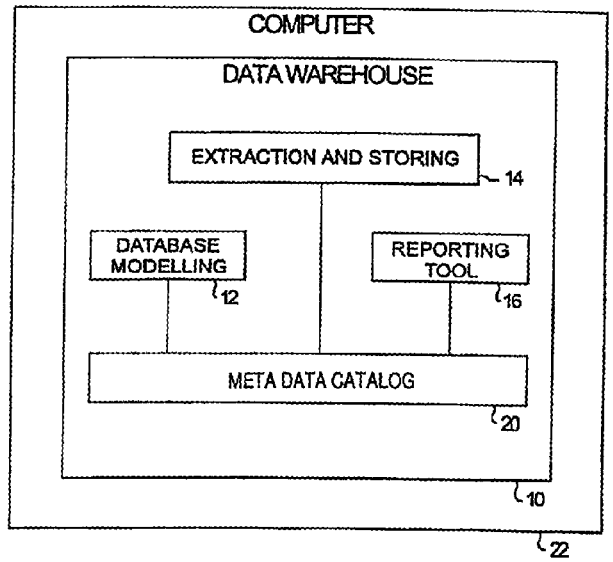

Fig. 1

Column 4,
Line 17, "clam" should read -- claim --.

Signed and Sealed this

Eleventh Day of March, 2008

JON W. DUDAS
*Director of the United States Patent and Trademark Office*